(No Model.)
A. PENNELL & G. SULLIVAN.
WATER TANK.
No. 498,568. Patented May 30, 1893.
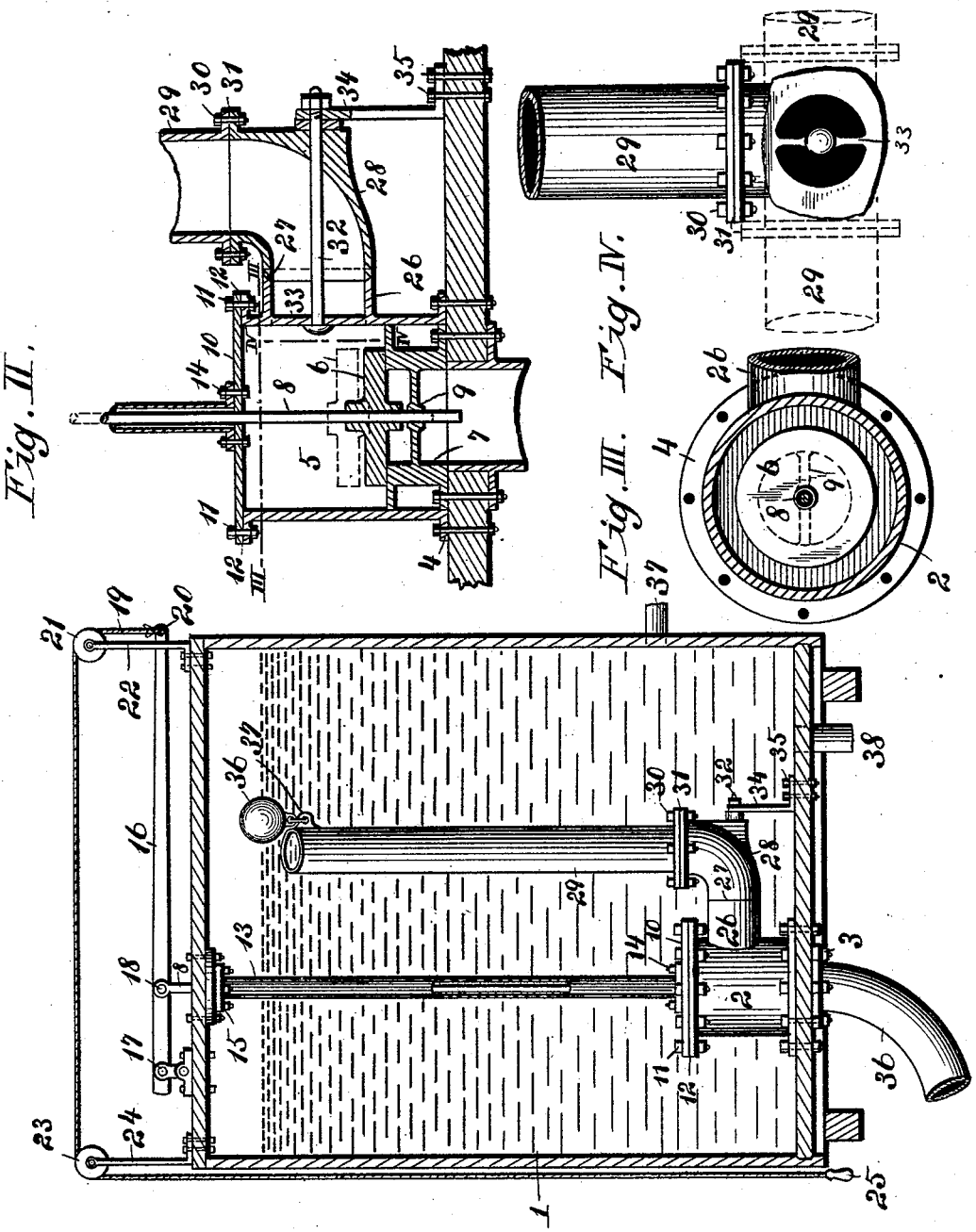
Witnesses:
F. G. Fischer
George E. Cruse
Inventors:
Arthur Pennell
Garrett Sullivan
By Knight Bros.
Attys.
THE NORRIS PETERS CO., PHOTO-LITHO., WASHINGTON, D. C.

UNITED STATES PATENT OFFICE.

ARTHUR PENNELL, OF KANSAS CITY, MISSOURI, AND GARRETT SULLIVAN, OF POCATELLO, IDAHO.

WATER-TANK.

SPECIFICATION forming part of Letters Patent No. 498,568, dated May 30, 1893.

Application filed May 19, 1892. Serial No. 433,629. (No model.)

*To all whom it may concern:*

Be it known that we, ARTHUR PENNELL, of Kansas City, in the county of Jackson and State of Missouri, and GARRETT SULLIVAN, of Pocatello, in the county of Bingham and State of Idaho, have invented certain new and useful Improvements in Water-Tanks, of which the following is a full, clear, and exact description, reference being had to the accompanying drawings, which form a part of this specification.

Our invention relates to certain new and useful improvements in water tanks, and our invention consists in certain features of novelty hereinafter described and pointed out in the claim.

Figure I, represents a vertical section of our improved tank, showing the apparatus for discharging the water. Fig. II, is an enlarged detail vertical section of the valve for discharging the water, also showing the lower end of the inlet pipe. Fig. III, is a transverse section taken on line, III, III, Fig. II. Fig. IV, is a detail view, showing a section taken on on line IV, IV, Fig. II.

Referring to the drawings: 1, represents the tank constructed of suitable material. Said tank may be used for various purposes, but in the present application we have shown it as used for railway service.

2, represents a drum secured to the bottom of the tank by means of bolts, 3, which pass through a flange, 4, on said drum. The interior of the drum, 2, is mainly taken up with a chamber, 5, in which operates a valve, 6.

7, represents a valve seat in the interior of the chamber, 5, said valve, 6, having a stem, 8, secured thereto, the lower end of said stem passing through a guiding web, 9, secured to the valve seat.

10, represents a top plate connected with the body of the drum by means of bolts, 11, and flanges, 12, said plate being provided with an opening in its center through which the valve stem, 8, extends, to a point above the top of the tank, 1. The valve stem, 8, is inclosed within a pipe, 13, said pipe being secured at its lower end to the top plate, 10, as shown at 14, and at its upper end to the top of the tank, as shown at 15, the object of said pipe being to prevent any passage of water into the chamber, 5, around the valve stem, 8.

16, represents a lever pivoted to the top of the tank as shown at 17. The top end of the valve stem, 8, is pivoted to the lever, 16, as shown at 18.

19, represents a cord secured to the outer end of the lever, 16, as shown at 20, said cord passing over a pulley, 21, journaled to a bracket, 22, thence over a pulley, 23, journaled to a bracket, 24; said cord hanging down along the side of the tank, and having a hand-piece, 25, within easy reach of the fireman.

26, represents a short extension of pipe integral with the drum, 2, to which is connected by a ground joint, as shown at 27, an elbow, 28.

29, represents an inlet pipe preferably formed of galvanized iron, the lower end of said inlet pipe being secured to the elbow, 28, by means of bolts, 30, and flanges, 31. The elbow, 28, is held in conjunction with the extension, 26, by means of a bolt, 32, having its inner end engaging a web, 33, in the extension, and its outer end passing through a bracket, 34, secured to the bottom of the tank, as shown at 35.

36, represents a float connected with a lug, 37, near the upper end of the inlet pipe, 29. The object of the float, 36, is to always support the upper end of the inlet pipe, 29, at a short distance beneath the surface of the water in the tank, 1. No matter what the height of the water is in the tank, as the water is used, and consequently descends, the elbow, 28, of the pipe, 29, being secured to the extension, 26, of the drum 2, turns on its ground joint, as shown in dotted lines, Fig. IV, thus descending with the water as the same is used. By the use of our device, the water is always drawn from a tank near to its surface, where it is clearest, thus avoiding the draining of the sediment which naturally sinks to the bottom of the tank. As the valve, 6, is raised by drawing down on the rope, 19, the water passes through the chamber, 5, from the inlet pipe, 29, and is discharged into the locomotive tank through a pipe, 36. We do not, however, confine ourselves to the use of our improved tank for railway services alone, as it can be used in breweries and various other places where it is desired to draw off the clear liquid without stirring up the sediment which naturally sinks to the bottom of the tank.

37, represents a supply pipe, and 38, a discharge opening through which the tank may be flushed in order to clean the same at intervals.

We claim as our invention—

The combination of a tank, a drum located at the bottom of the tank, a valve located therein suitable means for operating the valve, an immersed pipe forming a means of discharge pivotally secured to the side of the drum by means of a bolt, a bracket for supporting the pipe, and a float secured to the pipe for supporting the upper end of the same, substantially as set forth.

ARTHUR PENNELL.
GARRETT SULLIVAN.

Witnesses as to the signature of Arthur Pennell:
JAMES E. KNIGHT,
F. G. FISCHER.

Witnesses as to the signature of Garrett Sullivan:
P. L. HUGHES,
E. B. HAMILTON.